United States Patent [19]

Trzebiatowski

[11] 4,039,058

[45] Aug. 2, 1977

[54] ONE-WAY CLUTCH AND BACKSTOP INCORPORATING THE SAME

[75] Inventor: Peter M. Trzebiatowski, Milwaukee, Wis.

[73] Assignee: The Falk Corporation, Milwaukee, Wis.

[21] Appl. No.: 619,808

[22] Filed: Oct. 6, 1975

[51] Int. Cl.² .............................................. F16D 15/00
[52] U.S. Cl. ................................... 192/45; 188/82.84
[58] Field of Search ....................... 188/82.84; 192/45

[56] References Cited

U.S. PATENT DOCUMENTS

| | | | |
|---|---|---|---|
| 2,835,364 | 5/1958 | Picard | 192/45 |
| 2,998,113 | 8/1961 | Marland | 192/45 |
| 3,236,337 | 2/1966 | Marland et al. | 188/82.84 |
| 3,247,935 | 4/1966 | Marland | 192/45 |
| 3,633,713 | 1/1972 | Marland | 192/45 |

*Primary Examiner*—Benjamin W. Wyche
*Attorney, Agent, or Firm*—Quarles & Brady

[57] ABSTRACT

A backstop is illustrated which includes a one-way clutch formed of an inner race having an annular, projecting cam portion with upright end walls, and an outer race spaced from the cam portion and having a smooth cylindrical inner surface. The cam portion is formed with indentations which define wedge-like spaces with the outer race and a series of rollers are disposed between the races, with one roller in each indentation. The series of rollers are held in spaced relation by a cage. Stop lugs are secured to the side walls of the cam portion and extend radially outwardly to overlie the sides of the roller cage. The roller cage includes capscrews whose heads engage the stop lugs to prevent the rollers from shifting to the deepest part of the indentations. Tension springs connected between the cage and stop lugs urge the cage in the opposite direction to engage the rollers between the races. End covers are secured to the sides of the outer race and are mounted on ball bearings supported on the inner race. The end covers have a projecting mounting portion which receives one end of a torque arm. An oil chamber is formed by the end covers about the roller cage, and grease chambers are formed adjacent each axial end of the backstop by spaced, back-to-back pairs of shaft seals.

6 Claims, 6 Drawing Figures

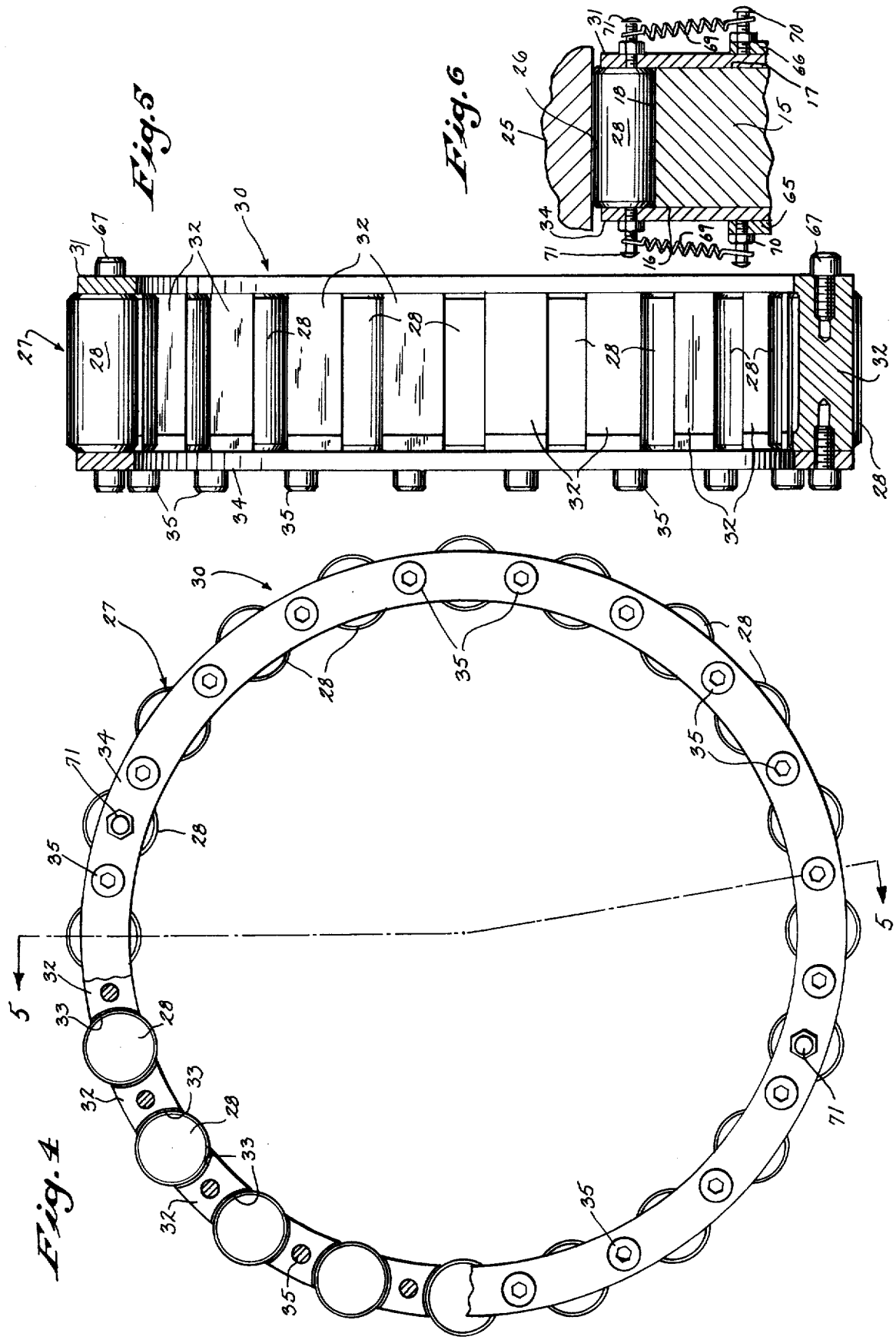

ONE-WAY CLUTCH AND BACKSTOP INCORPORATING THE SAME

BACKGROUND OF THE INVENTION

This invention relates to one-way clutches, and more particularly to an improved roller type, one-way clutch and to a backstop incorporating such a clutch.

Clutches are well known which are free-wheeling in one direction of relative rotation between their elements and which will automatically prevent reverse rotation. One form of such one-way clutches employs a series of rollers which are disposed between inner and outer races. One of the races has a smooth cylindrical surface and the other is provided with a series of indentations formed by inclined surfaces which define wedge-shaped spaces between the races. In one direction of rotation of the races relative to each other, the rollers will seek the wide portion of the wedge-like space and thus not impede the relative rotation of the races. Attempts to rotate the races relative to each other in an opposite direction will, however, result in the rollers being wedged between the races and thereby preventing rotation.

In such roller type, one-way clutches it is common to employ a light tension spring to urge the rollers into an engaging, or wedging position so that as soon as rotation in the locked direction is attempted, the rollers will be positively engaged to halt the rotation. It is also common to employ a mechanism to prevent the rollers from being moved relatively too far into the deepest portion of the indentations. Thus, as shown in U.S. Pat. No. 3,017,002 issued Jan. 16, 1962 to J. A. Marland for "One-Way Clutch", a stop lug is connected to the cage for the rollers and is adapted to engage a portion of one of the indentations so as to prevent the rollers held by the cage from themselves shifting to the deepest part of the indentations. In such patent, the stop lugs ride in special slots cut in the inner race for that purpose and thereby also act to provide axial restraint of the cage assembly relative to the inner race.

One-way clutches are often employed in backstops whose function it is to prevent a shaft from being rotated in a reverse direction so that a prime mover, for example, driving the shaft will not be damaged by the reverse rotation. Conveyor drive trains are one type of installation in which backstops are typically employed. In a backstop the inner race is normally connected to the shaft to be controlled and the outer race is commonly connected to a stationary support. The connection to the stationary support may be by means of a torque arm which engages an abutment if reverse rotation is attempted. In such instances, the outer race is essentially held stationary except for the very slight motion which is permitted before the torque arm engages the abutment.

Examples of backstops employing a roller type, one-way clutch are found in U.S. Pat. No. 2,865,474 issued Dec. 23, 1958 to J. A. Marland for "One-Way Automatic Backstops", and in U.S. Pat. No. 3,236,337 issued Feb. 22, 1966 to J. A. Marland and C. W. Hill for "One-Way Backstop".

SUMMARY OF THE INVENTION

In accordance with one aspect of the invention there is provided a one-way clutch including coaxial inner and outer races one of which has a smooth cylindrical surface and the other of which has a confronting cam portion provided with a series of spaced indentations, a plurality of rollers held in a cage with each roller disposed within one of the indentations so as to coact between the inner and outer races, stop lugs extending radially from the cam portion and overlying the cage on either side thereof, and a projection on each side of the cage adapted to engage a stop lug before the rollers descend to the deepest portion of the indentation.

In accordance with another aspect of the invention, there is provided a backstop which includes an inner race adapted for connection to a shaft, an annular outer race, one of the races having a smooth cylindrical surface and the other having a confronting cam surface with a plurality of wedge-like indentations, a plurality of rollers, one for each indentation, a cage rotatably holding said rollers in spaced relation, a pair of end covers, one of which is connected to each side of the outer race, and each including spaced apart mounting portions disposed outboard of the outer race, and a torque arm connected to and disposed between the connecting portions of the end covers and projecting outwardly from the end covers, the mounting portions including pairs of aligned bores disposed equidistant from the axis of the backstop and the torque arm having a pair of openings aligned with the bores, together with connecting pins extending through the aligned bores and openings.

In accordance with yet another aspect of the invention, there is provided a backstop which includes an inner race adapted for connection to a shaft, an annular outer race, one of the races having a smooth cylindrical surface and the other having a confronting cam surface with a plurality of wedge-like indentations, a plurality of rollers, one for each indentation, a cage rotatably holding said rollers in spaced relation, a pair of end covers, one of which is connected to each side of the outer race, and mounted for rotation on the inner race, a pair of axially spaced shaft seals disposed between each end cover and a respective end of the inner race, the seals of each pair being disposed back-to-back to define a grease chamber therebetween, and the outer race and end covers between the pairs of seals defining an oil chamber for the rollers.

It is a principal object of the invention to provide an improved one-way clutch which is simple in construction, and less expensive to manufacture and assemble than existing one-way clutches.

It is a further object of the invention to provide an improved backstop employing a one-way clutch, which backstop is readily assembled in the environment in which it is to be used, and has positive protection against external contaminants, such as dust or grit, contacting the rotating elements of the backstop.

The foregoing and other objects and advantages of the invention will appear in the detailed description which follows. In the description reference is made to the accompanying drawings which illustrate a preferred embodiment of the one-way clutch and backstop incorporating the same.

BRIEF DESCRIPTION OF THE DRAWINGS

FIG. 4 is a view in elevation of the roller assembly including rollers and cage forming a port of the one-way clutch assembly;

FIG. 5 is a view in vertical section of the roller assembly taken in the plane of the line 5—5 of FIG. 4; and FIG. 6 is a view in section taking in the plane of the line 6—6 of FIG. 2 and showing the details of the energizing spring assembly for the one-way clutch.

DETAILED DESCRIPTION OF THE PREFERRED EMBODIMENT

Figure 1:
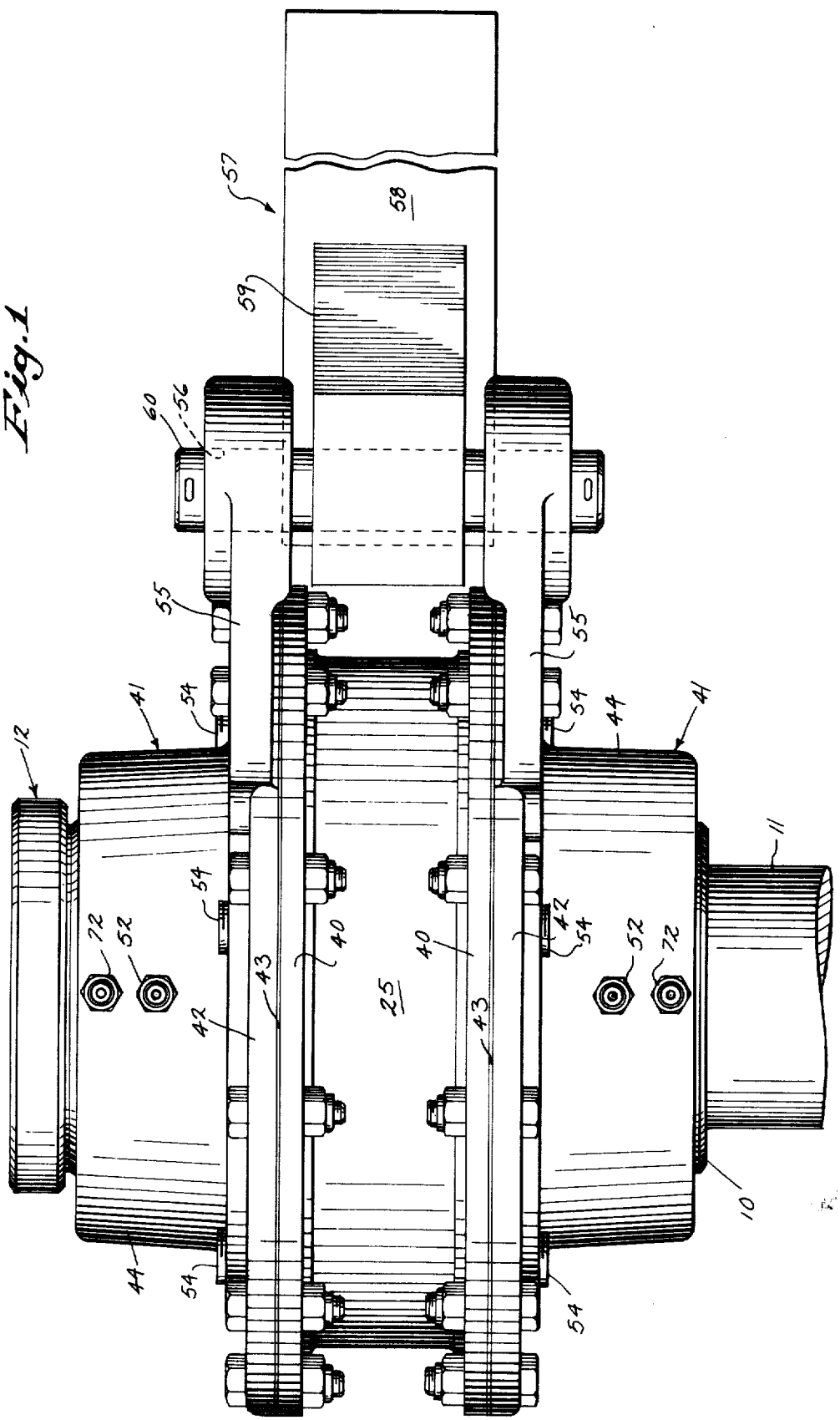
FIG. 1 is a top plan view of a backstop incorporating the invention and shown connected to a shaft to be controlled.

Referring to the drawings, an inner race of a one-way clutch is provided by a hub 10 adapted to be keyed to a shaft 11 which is to be controlled by the backstop. An annular collar 12 is adapted to surround a projecting end of the shaft 11 and to be connected thereto by a pair of oppositely disposed radially directed set screws 13. The collar 12 is also affixed to the hub 10 by means of a pair of screws 14 which extend axially from the collar 12 into an end of the hub 10. In this manner, the hub 10, which is normally loosely fitted about the shaft 11, will be axially restrained upon the shaft 11.

Figure 2:
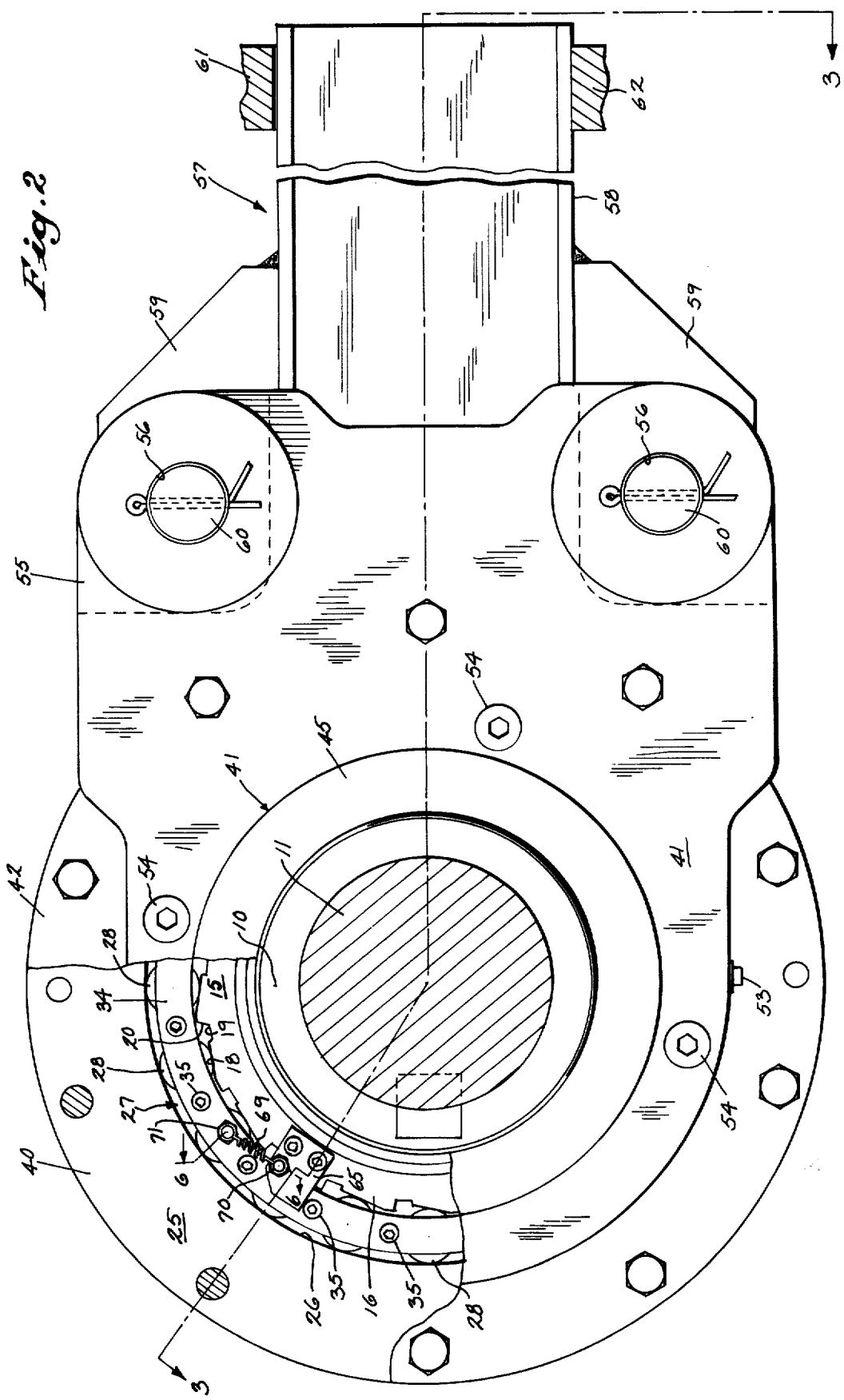
FIG. 2 is a side view in elevation of the backstop of FIG. 1 with a portion of one end cover broken away to illustrate the one-way clutch assembly within the backstop.

The hub 10 includes a central annularly projecting cam portion 15 having upright planar side walls 16 and 17, respectively. The cam portion 15 has a plurality of cam surfaces formed as indentations in its outer periphery. As seen in FIG. 2, each indentation includes a planar cam surface 18 which extends at an angle relative to a tangent to the periphery of the cam portion 15. The cam surfaces 18 extend to axial troughs 19 defining the lowermost portion of each indentation and the troughs are bordered by a generally radial, upright surface 20 which marks the termination, or trailing surface, of an indentation.

Coaxial with the hub 10 is an outer race member 25. The outer race 25 has a smooth cylindrical inner surface 26 which confronts the indentations in the cam portion 15 of the inner race 10. The cam surfaces 18 of the indentations define, with the smooth cylindrical surface 26 of the outer race 25, a series of wedge-like spaces between the races.

A roller assembly, designated generally by the numeral 27, is disposed between the inner and outer races 10 and 25, respectively. The roller assembly 27 includes a plurality of identical cylindrical rollers 28. Each roller 28 is adapted to be disposed within one of the indentations formed in the cam portion 15. The rollers 28 are held in spaced relation with respect to each other by a cage formed of a first cage element 30 having a ring-like base portion 31 and axially extending spacer portions 32 formed integral with the base portion 31. The spacer portions 32 are provided with opposing circular cylindrical surfaces 33 which accommodate the rollers 28. The diameter of the confronting surfaces 33 is somewhat greater than that of the rollers 28 so that the rollers are free to move slightly within the pockets formed by adjacent spacer portions 32 and are also free to rotate within such pockets. The roller cage is completed by a cover 34 which is connected to the ends of each spacer portion by capscrews 34.

Figure 3:
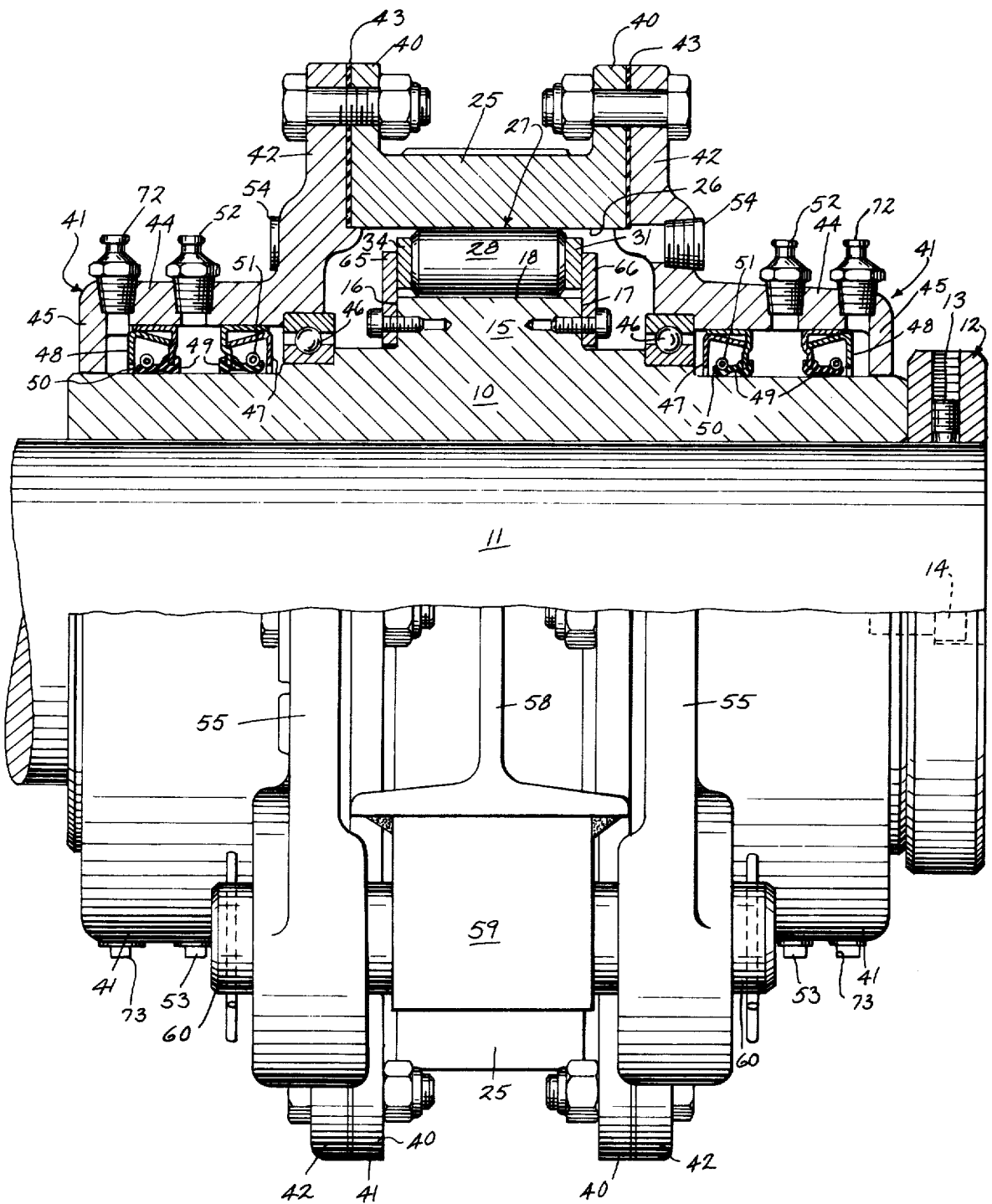
FIG. 3 is a view in section taken in the plane of the line 3—3 of FIG. 2.

The outer race member 25 has a generally channel-shaped cross section with outwardly projecting side flanges 40. An end cover 41 is connected to each of the flanges 40. The end covers 41 may be identical and each is generally dish-shaped with an outwardly extending rim portion 42 bolted to a respective one of the flanges 40 of the outer race member 25. A gasket 43 is interposed between each flange 40 and rim portion 42 to make the connection oiltight. The end covers 41 also include an axially extending sleeve portion 44 and an inwardly directed rim portion 45. The sleeve portion 44 of each end cover 41 is disposed about the hub 10 and rotatably mounted thereon by a ball bearing 46. A pair of spaced shaft seals 47 and 48 are disposed within the sleeve portion 44 of each end cover 41 and seal against the outer circumference of the hub 10. The seals 47 and 48 are of known construction and each includes a flexible element 49 including an outer lip 50 held against the surface to be sealed by a hoop spring 51. As seen in FIG. 3, the seals 47 and 48 of each pair are arranged back-to-back and the space between the seals 47 and 48 functions as a grease chamber. A radial bore with a grease fitting 52 extends through each sleeve portion 44 into the space of the grease chamber between the seals 47 and 48. A second radial bore with a removable plug 53 extends through the sleeve portion at a diametrically opposed position. The space between the seals 47 and 48 is filled with grease injected through the fitting 52, with air, or old grease, purged through the opposite bore when the plug 53 is removed.

The space between each outer seal 48 and the inner rim 45 of the respective sleeve portion 44 is also filled with grease. The grease can be injected through a grease fitting 72 inserted in a radial bore extending through each sleeve portion 44. A purge opening is also provided by an oppositely disposed bore which is normally closed by a plug 73.

The grease filling the space between the seals 47 and 48 will lubricate the seals 47 and 48 and will act as a further barrier to the entry of contaminates into the interior of the backstop. The grease in the space between the outer seal 48 and the lip portion 45 will act as a barrier to the entry of dirt, dust or other contaminates and can be periodically purged and filled with new grease. The inboard volume of the backstop between the inboard seals 47 is filled with oil which can be introduced through a plurality of axial bores in the outer rims 42. Such bores are normally closed by threaded pipe plugs 54.

The end covers 41 also each include a radial extending mounting portion 55 which includes a pair of spaced apart bores 56 which are equidistant from the axis of the backstop. The bores 56 are formed in built-up sections provided integral with the mounting portion 55. A torque arm 57 is adapted to be connected between and to the spaced mounting portions 55 of the two end covers 41. The torque arm 57 includes an elongated I-beam portion 58 and a pair of ears 59 extending from opposite flanges of the I-beam portion 58 at one end thereof. The ears 59 have openings which may be aligned with the bores 56 in the spaced mounting portions 55 and a pair of connecting pins 60 pass through the aligned bores 56 and openings to join the torque arm 57 to the end covers 41. In a known manner, the projecting end of the torque arm 57 is constrained between stationary abutments 61 and 62 so that the outer race member 25 is essentially held stationary.

Referring to FIG. 2, when the outer race member 25 is held stationary the shaft 11, and consequentially the inner race 10, can freely rotate in a counterclockwise direction (as viewed in FIG. 2) since the rollers 28 will under such circumstances be urged towards the deep end of the wedge-shaped space between the inner and outer races. In that direction of rotation the backstop will not function to impede the rotation of the shaft 11. If the roller assembly 27 was unrestrained, rotation of the inner race 10 in a counterclockwise direction as viewed in FIG. 2 would tend to seat the rollers 28 against the upright surfaces 20 of each indentation. This could result in excessive wear of the rollers and inner race and is generally undesirable. To prevent that action from occurring, means are provided to restrict the degree to which the roller assembly 27 may be displaced relative to the inner hub 10. The means for accomplishing this includes two pairs of stop lugs 65 and 66. The stop lugs 65 and 66 are each screwed to a respective side wall 16 and 17 of the cam portion 15. The stop lugs 65 and 66 extend radially outwardly of the cam portion and overlie the sides of the roller cage. The radially extending portions of the lugs 65 and 66 axially restrain and locate the roller assembly 27 on the cam portion 15.

As shown in FIG. 2, the stop lug 65 on the side of the cage which includes the cover 34 is adapted to be engaged by the head of one of the capscrews 35 which connect the cover 34 to the first cage member 30. The stop lug 66 on the opposite side of the roller cage is adapted to engage the head of the capscrew 67 which is threaded into the base portion 31 for that specific function. A second pair of indentical stop lugs are placed at a diametrically opposed position on the cam portion 15.

The stop lugs 65 and 66 are so positioned on the cam portion 15 relative to the cage, that when the heads of the capscrews 35 and 67 are in contact with the stop lugs 65 and 66, the rollers 28 will be prevented from engaging and rubbing against the upright surfaces 20 when the backstop is free wheeling.

Tension springs 69 are connected between screws 70 attached to each of the lugs 65 and 66, and second screws 71 attached to the sides of the roller cage. The springs 69 function to urge the roller assembly 27 in a direction relative to the hub 10 such that the rollers 28 will wedge between the inclined cam surfaces 18 and the inner surface 26 of the outer race 25. During free wheeling, the springs exert insufficient force to cause the rollers 28 to engage. However, as soon as reverse rotation is attempted, the springs 69 will urge the rollers 28 into a position where wedging engagement with the inner and outer races will promptly occur.

The construction of the one-way clutch is simplified by employing the upright side walls 16 and 17 of the cam portion 15 as the mount for the stop lugs 65 and 66. The one-way clutch is further simplified by employing the headed fasteners which are needed for the assembly of the cover 34 to the cage member 30 as projections to engage the stop lugs.

In assembling the backstop in the environment in which it will be used, the preassembled hub 10 with outer race 25 and end covers 41 may be placed upon the end of the shaft 11 and the collar 12 may then be secured to the shaft 11 and to the end of the hub 10. Once this assembly has been accomplished, the torque arm can then be placed in place and the torque arm and remainder of the backstop can be rotated relative to each other and otherwise manipulated to align the openings in the ears 59 with the bores 56 for insertion of the connecting pins 60. The direction of free rotation permitted by the backstop can be changed by simply reversing the hub 10 on the shaft 11. That is, if the hub 10 were mounted on the shaft 11 end-for-end from that shown, the direction of free rotation would be reversed and the backstop would prevent counterclockwise rotation (as viewed in FIG. 2) of the shaft 11.

I claim:
1. In a one-way clutch, the combination comprising:
coaxial inner and outer race members, one of said race members having a smooth cylindrical surface and the other of said race members having a cam portion which includes a plurality of spaced indentations confronting said smooth surface and spaced therefrom, said indentations being so shaped as to deefine a generally wedge-shaped space with said smooth surface and each indentation terminating in a generally radially upright trailing surface;
a roller assembly including a roller cage and a plurality of rollers disposed for rotation in said cage, each of said rollers being disposed within a respective one of said indentations to coact between the indentation and the smooth surface of the confronting race member; a pair of stop lugs, each stop lug secured to and extending radially from said cam portion at a position axially outwardly of said indentations and overlying a respective side of said cage; and
a projection on each side of said cage and adapted to engage one of said stop lugs before said rollers engage the trailing surfaces of said indentations.

2. In a one-way clutch, the combination comprising:
coaxial inner and outer race members, one of said race members having a smooth cylindrical surface and the other of said race members having a cam portion which includes a plurality of spaced indentations confronting said smooth surface and spaced therefrom, said indentations being so shaped as to define a generally wedge-shaped space with said smooth surface and each indentation terminating in a generally radially upright trailing surface;
a roller assembly including a roller cage and a plurality of rollers disposed for rotation in said cage, each of said rollers being disposed within a respective one of said indentations to coact between the indentation and the smooth surface of the confronting race member;
a pair of stop lugs, each stop lug extending radially from said cam portion and overlying a respective side of said cage; and
a projection on each side of said cage and adapted to engage one of said stop lugs before said rollers engage the traling surfaces of said indentations;
said cam portion projecting radially from said other race member and having radially disposed end walls,
the axial width of said cage being less than the distance between said end walls, and
said stop lugs being each secured against a respective one of said end walls.

3. A one-way clutch in accordance with claim 2 together with a tension spring connected at one end to one of said stop lugs and at its other end to the adjacent side of said cage to urge said cage and the rollers held therein in a direction to wedge said rollers between said race members.

4. The one-way clutch in accordance with claim 2 wherein said inner race is adapted for connection to a shaft,
together with a pair of end covers, one of which is connected on each side to said outer race and mounted for rotation on said inner race, said end covers each including a mounting portion extending outboard of said outer race, and a torque arm disposed between and secured to said mounting portions of said end covers and projecting outwardly therefrom.

5. In a one-way clutch, the combination comprising:

an inner race including a radially extending annular cam portion having upright end walls, said cam portion including a series of indentations each formed to include a flat surface inclined from a tangent to the circumference of said cam portion and a generally radially extending trailing surface defining the termination of an indentation;

a coaxially disposed outer race having a smooth cylindrical inner surface spaced from said cam portion;

a roller assembly including a plurality of rollers each of which is disposed in one of said indentations and a cage holding said rollers in spaced relation to each other, said roller cage being substantially coextensive in width to the axial dimension of said cam portion;

said cage including:
  a first member having a ring-like base portion defining one side of said cage and a plurality of spacers extending axially from and integral with said base portion, adjacent spacers defining openings therebetween to engage a roller,
  and a ring-like cover portion connected to the spacers by headed fasteners;

stop lugs secured to the end walls of said cam portion and extending radially outwardly to overlie the sides of said cage; and one of said headed fasteners functions as a projection to engage one of said stop lugs to thereby limit the shifting of said cage relative to said inner race in the direction in which said rollers move toward said trailing surfaces.

6. In a one-way clutch, the combination comprising:

an inner race including a radially extending annular cam portion having upright end walls, said cam portion including a series of indentations each formed to include a flat surface inclined from a tangent to the circumference of said cam portion and a generaly radially extending trailing surface defining the termination of an indentation;

a coaxially disposed outer race having a smooth cylindrical inner surface spaced from said cam portion;

a roller assembly including a plurality of rollers each of which is disposed in one of said indentations and a cage holding said rollers in spaced relation to each other, said roller cage being substantially co-extensive in width to the axial dimension of said cam portion;

stop lugs secured to the end walls of said cam portion and extending radially outwardly to overlie the sides of said cage;

projections on the sides of said roller cage adapted to engage said stop lugs to thereby limit the shifting of said cage relative to said inner race in the direction in which said rollers move toward said trailing surfaces; and tension springs each anchored at one end to a respective one of said stop lugs and at its other end to a side of said cage, said springs urging said cage in a direction to wedge said rollers between said races.

* * * * *